United States Patent
Chen

(10) Patent No.: US 11,125,381 B2
(45) Date of Patent: Sep. 21, 2021

(54) SUPPORT WITH SELF-LOCKING FUNCTION

(71) Applicant: Jiashan Qianxinhe Electronics Technology Co., Ltd., Jiashan (CN)

(72) Inventor: Bo Chen, Jiashan (CN)

(73) Assignee: Jiashan Qianxinhe Electronics Technology Co., Ltd., Jiashan (CN)

( * ) Notice: Subject to any disclaimer, the term of this patent is extended or adjusted under 35 U.S.C. 154(b) by 77 days.

(21) Appl. No.: 16/610,074

(22) PCT Filed: Nov. 8, 2018

(86) PCT No.: PCT/CN2018/114615
§ 371 (c)(1),
(2) Date: Oct. 31, 2019

(87) PCT Pub. No.: WO2019/091430
PCT Pub. Date: May 16, 2019

(65) Prior Publication Data
US 2020/0149680 A1    May 14, 2020

(30) Foreign Application Priority Data
Nov. 10, 2017 (CN) .......................... 201711101751.2

(51) Int. Cl.
*F16B 45/00* (2006.01)
*F16M 13/02* (2006.01)
*F21V 21/26* (2006.01)

(52) U.S. Cl.
CPC .......... *F16M 13/022* (2013.01); *F16B 45/00* (2013.01); *F21V 21/26* (2013.01); *F16M 2200/021* (2013.01)

(58) Field of Classification Search
CPC ............ F16M 13/022; F16M 2200/021; F16B 45/00; F21V 21/26
USPC .................. 248/691, 308, 339; 362/382, 396
See application file for complete search history.

(56) References Cited

U.S. PATENT DOCUMENTS 7,896,537 B2 *  3/2011  Bartlett ................ H01R 25/142
                                                              362/648
10,344,962 B2 *  7/2019  Hershman ................ F21V 1/20

* cited by examiner

*Primary Examiner* — Todd M Epps
(74) *Attorney, Agent, or Firm* — Wang Law Firm, Inc.

(57) ABSTRACT

A support with a self-locking function includes a first supporting rod, a second supporting rod, a connecting portion and an elastic member. The first supporting rod is provided with at least one first locking hook and two rotating portions. The rotating portion has a spiral surface and is provided with a groove. The second supporting rod is provided with at least one second locking hook and a rotating portion. The rotating portion is provided with a stopper. The elastic member is sleeved on the connecting portion. The stopper is capable of sliding along the spiral step when the second supporting rod rotates relative to the first supporting rod, and is elastically pushed by the elastic member to insert into the groove. The first locking hook and the second locking hook are fastened in a snap-fit with each other, thereby realizing self-locking of the support without requiring manual locking.

10 Claims, 8 Drawing Sheets

SUPPORT WITH SELF-LOCKING FUNCTION

RELATED APPLICATION

This present application is a national stage entry of PCT Application, PCT/CN2018/114615, filed on Nov. 8, 2018.

BACKGROUND

1. Technical Field

The present invention relates to a supporting device, and more particularly to a support with a self-locking function.

2. Description of the Related Art

When performing various works at night or when there is insufficient light, such as construction in construction site, car repair, etc., work lights, ie, lights are required. The Lights sometimes need to be supported by a support so as to adjust to the desired height or angle. however, in prior art, the support has a long length and takes up a lot of space and is not convenient to carry.

Therefore, it is necessary to provide a support with a self-locking function which makes it possible to solve the above problem.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout two views.

DETAILED DESCRIPTION

The present application is illustrated by way of example and not by way of limitation in the figures of the accompanying drawings. It should be noted that references to "an" or "one" embodiment in this application are not necessarily to the same embodiment, and such references mean at least one.

Referring to FIG. 1 to FIG. 8, a support with self-locking function is shown in accordance with an exemplary embodiment of the present invention. The support with self-locking function include a first supporting rod 10, a second supporting rod 20, a connecting portion 30, and an elastic member 40. it can be understood that the support with self-locking function may include other functional module, such as assembly component, installation component, and so on, which are well known by a person skilled in the art and not described in detail.

Figure 1:
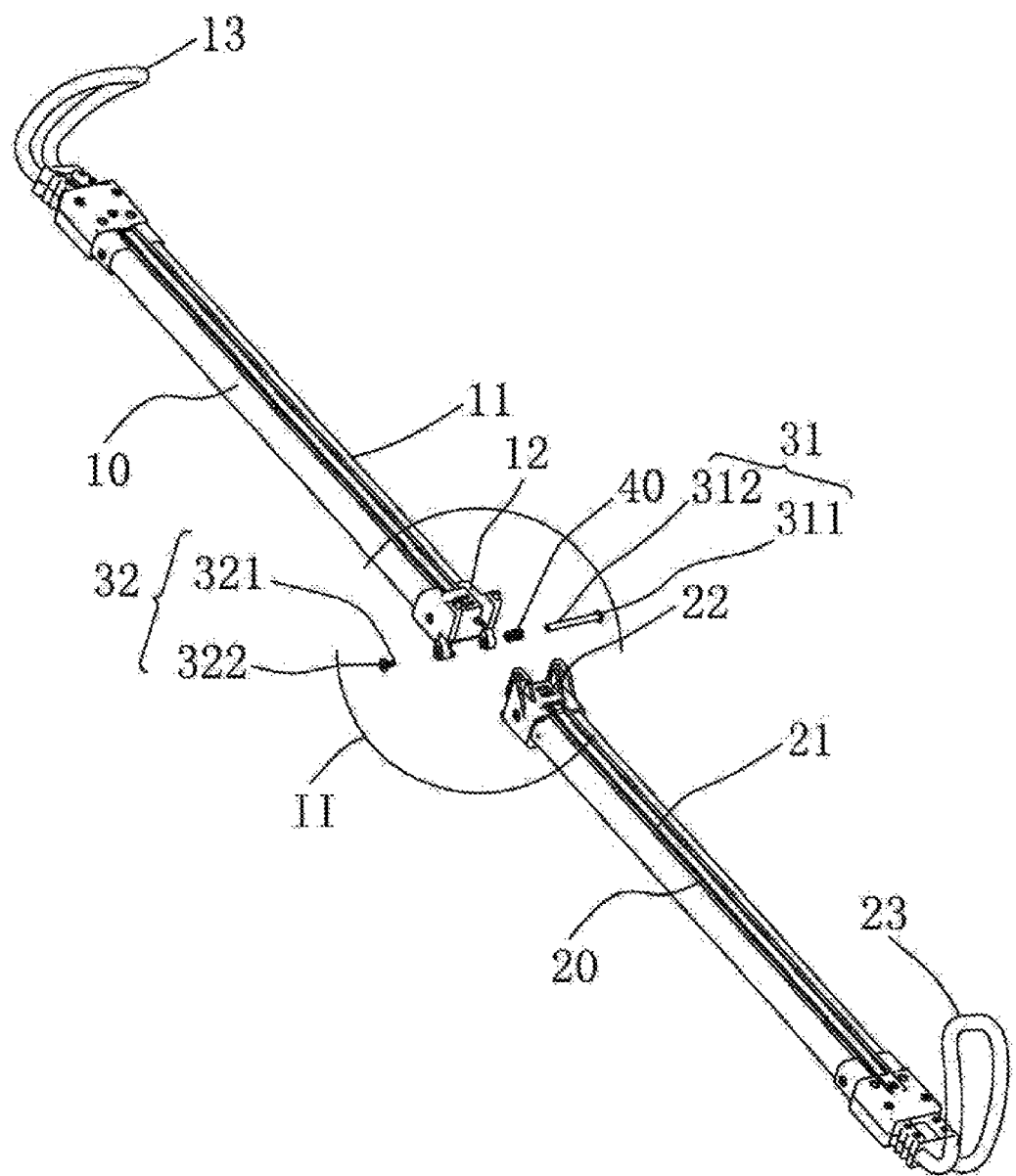
FIG. 1 is an explored view of a support with self-locking function according to an embodiment.
Figure 2:
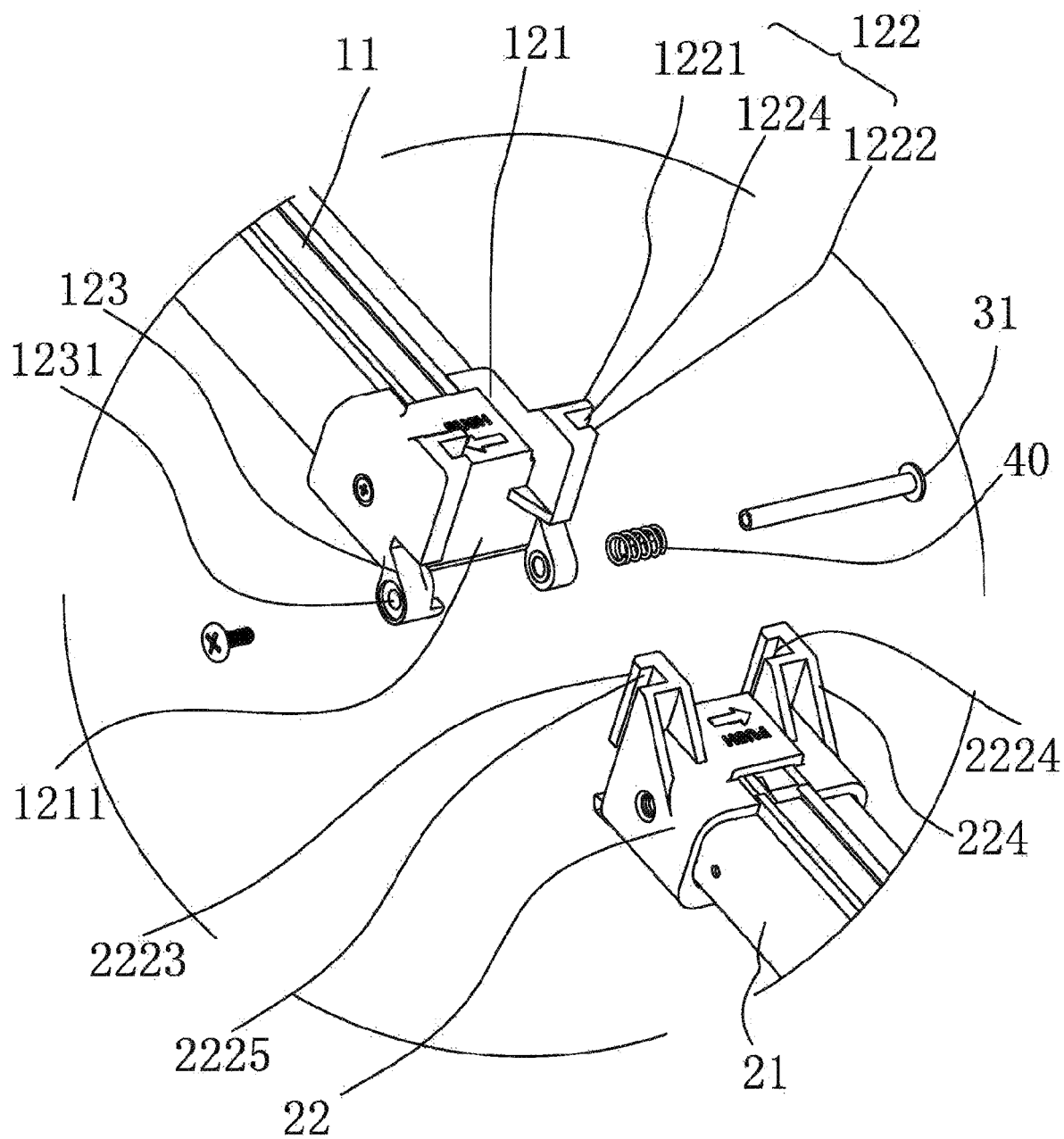
FIG. 2 is an enlarged schematic view of the support with self-locking function of FIG. 1 in II.
Figure 3:
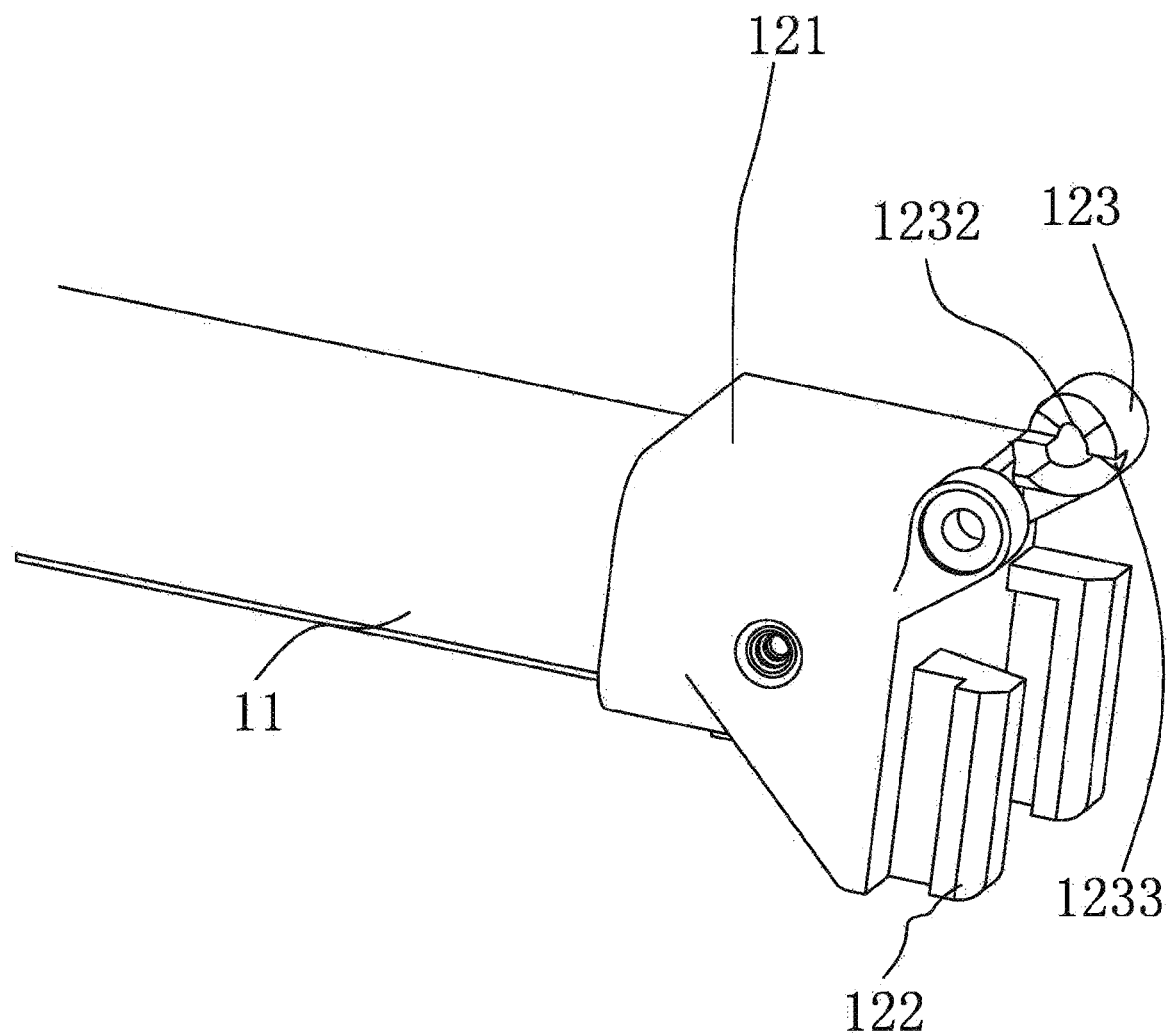
FIG. 3 is a partially enlarged schematic view of a first supporting rod of the support with self-locking function of FIG. 1.
Figure 4:
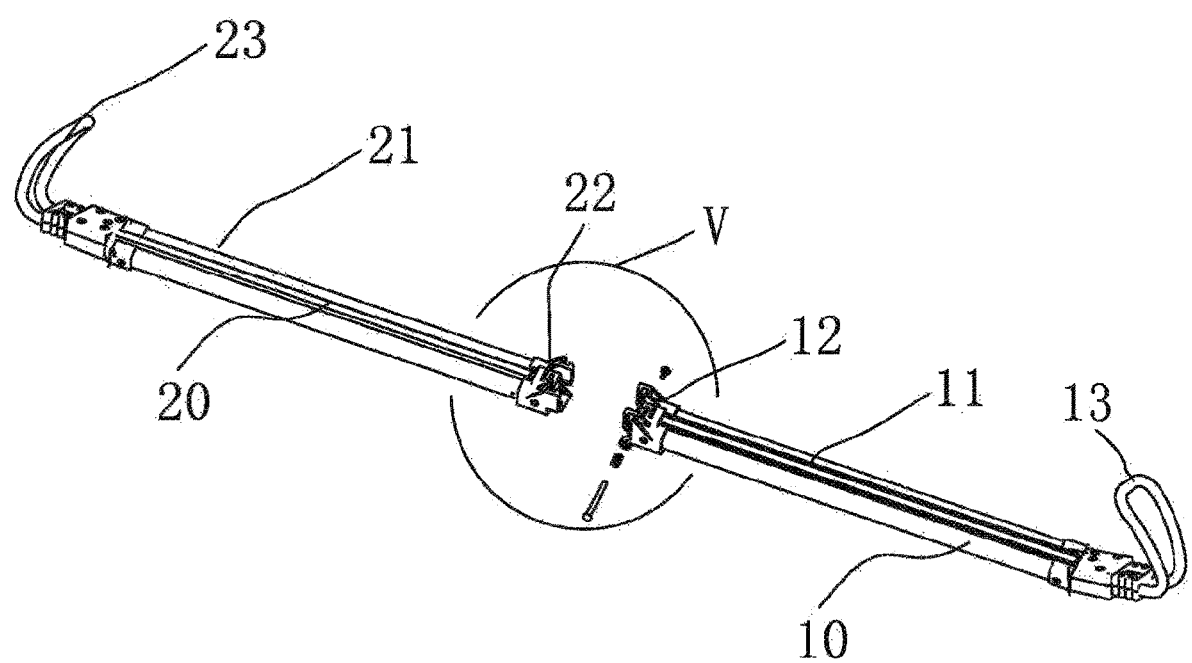
FIG. 4 is another explored view of the support with self-locking function of FIG. 1.
Figure 8:
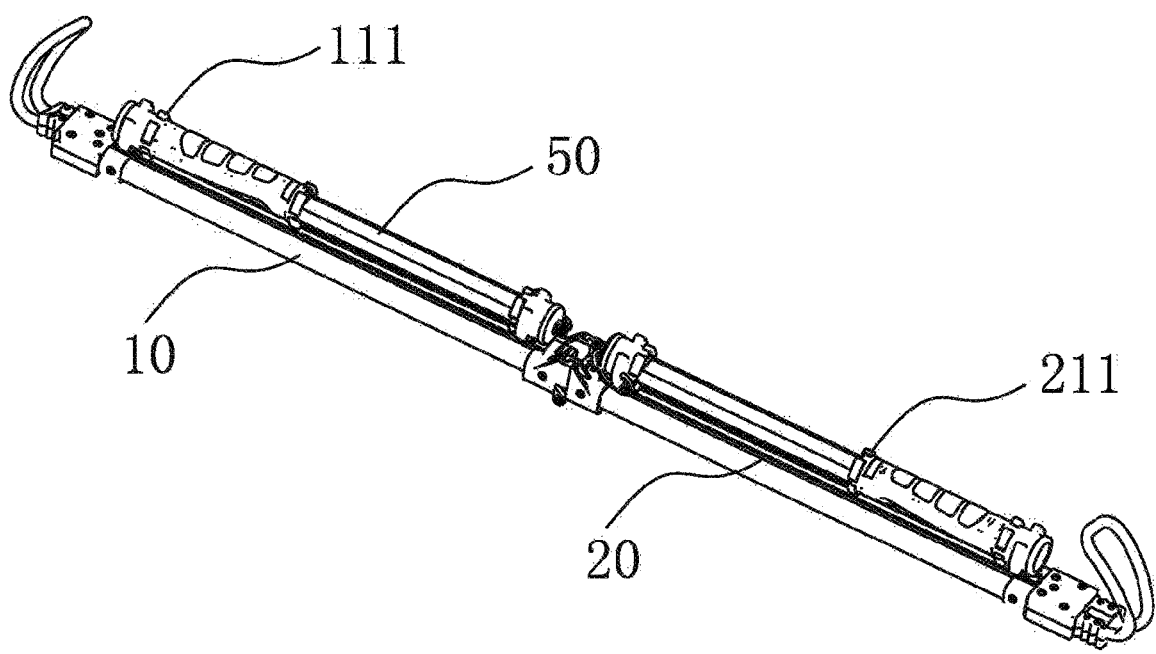
FIG. 8 is another schematic view of the support with self-locking function of FIG. 1, in which the first supporting rod and the second supporting rod are in an unfolded state and two work lights are disposed on the first supporting rod and the second supporting rod respectively.

The first supporting rod 10 includes a first rod 11, a first locking portion 12, and a first feet 13. At least two first snap ring 111 are arranged on the first rod 11 and are used to install the work lights 50 as shown in FIG. 8. The first locking portion 12 is embodied onto one end of the first rod 11 by means of common methods, such as screw, welding, and so on. The first feet 13 also can be embodied onto another end of the first rod 11 and has an arc shape. The first locking portion 12 includes a first base 121, two first locking hooks 122, and two rotating portions 123. Referring to FIG. 2, the first base 121 includes a first setting surface 1211. The first setting surface 1211 is located on a side opposite to the first rod 11. The two first locking hooks 122 and the two rotating portions 123 are arranged on the first setting surface 1211. In another exemplary embodiment of the present invention, the first locking portion 12 may only have one first locking hooks 122. The two rotating portions 123 are parallel to each other and respectively have a rotation hole 1231 opened thereon. Referring to FIG. 3 together, one of the two rotating portions 123 has a spiral step 1232 disposed thereon and a groove 1233 opened thereon. Furthermore, central axes of the two rotation holes 1231 are coincide with each other and the central axed of the two rotation holes 1231 are perpendicular to a central axis of the first rod 11.

Figure 5:
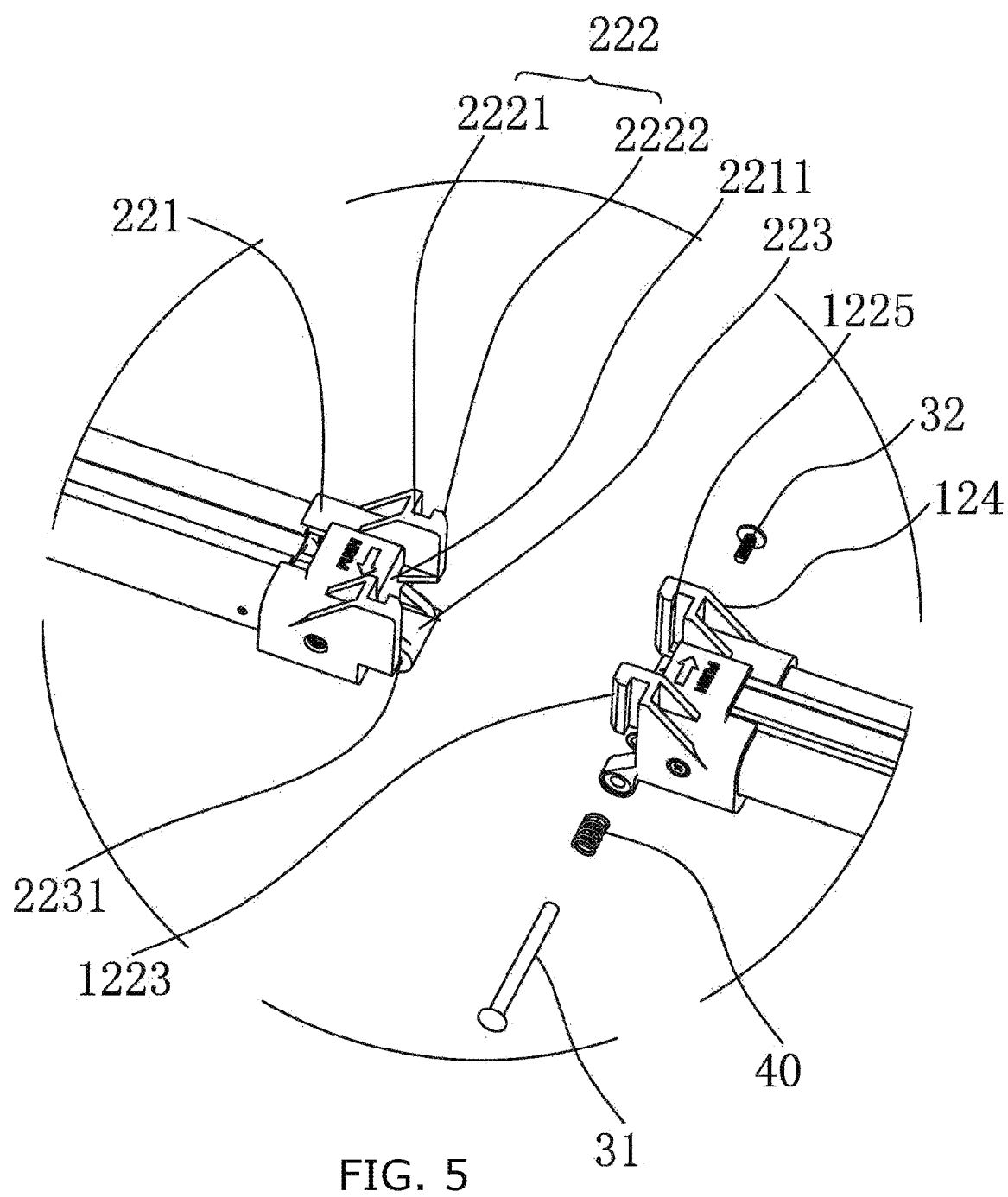
FIG. 5 is a partially enlarged schematic view of the support with self-locking function of FIG. 4 in V.

The two first locking hooks 122 are parallel to each other and an arrangement direction of the two first locking hooks 122 is parallel to the central axis of the rotation hole 1231. Each of the first locking hooks 122 includes a first root portion 1221 and a first locking part 1222 as shown in FIG. 2. The first root portion 1221 is connected to the first setting surface 1211. The first locking part 1222 extends from the free end of the first root portion 1221 taken along a direction parallel to the central axis of the rotation hole 1231. Moreover, a first guiding surface 1223, as shown in FIG. 5, is disposed on a side of the first locking part 1222 opposite to the first root portion 1221. A first receiving groove 1224 is formed among the first root portion 1221, the first base 121, and the first locking part 1222. Furthermore, the first root portion 1221 is perpendicular to the first setting surface 1211 and a first abutting surface 1225 is formed on the first locking part 1222 and is parallel to the first setting surface 1211.

Figure 6:
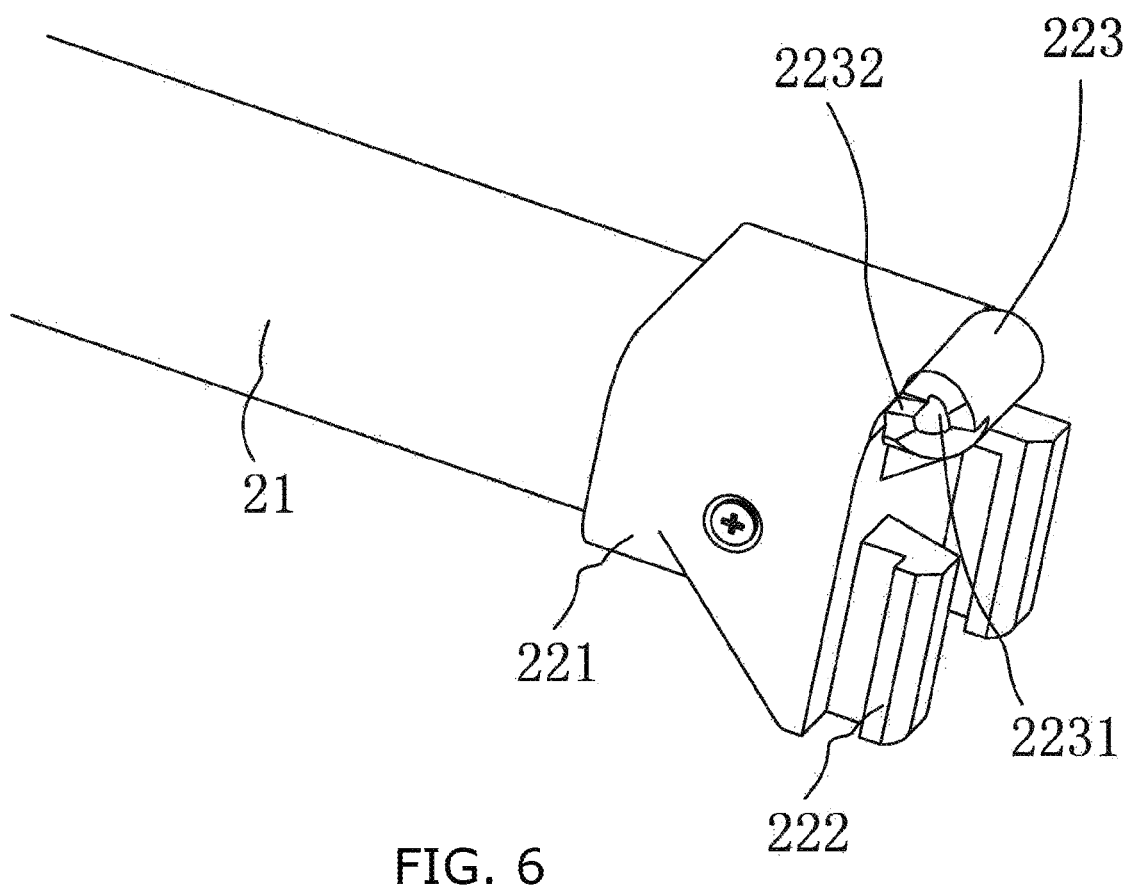
FIG. 6 is a partially enlarged schematic view of a second supporting rod of the support with self-locking function of FIG. 1.

Referring to FIG. 1 to FIG. 6, the second supporting rod 20 includes a second rod 21, a second locking portion 22, and a second feet 23. At least two second snap ring 211 are arranged on the second rod 11 and are used to install another work light 50 as shown in FIG. 8. The second locking portion 22 is embodied onto a free end of the second rod 20 be means of common methods, such as screws, welding, and so on. The second feet 23 is installed on another end of the second rod 21 opposite to the second locking portion 22 and has an arc shape. As shown in FIG. 5, the second locking portion 22 includes a second base 221, two second locking hooks 222, and a rotating part 223. The second base 221 has a second setting surface 2211 arranged thereon. The second setting surface 2211 is opposite to the second rod 21. The two second locking hook 222 and the rotating part 223 are arranged on the second setting surface 2211 together. In another exemplary embodiment of the present invention, the second locking portion 22 have only one second locking hook 222. As shown in FIG. 6, the rotating part 223 has a rotating hole 2231 opened thereon and a stopper 2232 disposed thereon. A central axis of the rotating hole 2231 is perpendicular to a central axis of the second rod 21.

The two second locking hooks 222 are parallel to each other and an arrangement direction of the two second locking hooks 222 is parallel to the central axis of the rotating hole 2231. As shown in FIG. 5, each of the second locking hook 222 includes a second root portion 2221, and a second locking part 2222. The second root portion 2221 is connected to the second setting surface 2211. The second locking part 2222 extends from the free end of the second root portion 2221 taken along a direction parallel to the central axis of the rotating hole 2231. The extending direction of the second locking part 2222 is opposite to that of the first locking part 1222. Moreover, a second guiding surface 2223, as shown in FIG. 2, is disposed on a side of the second locking part 2222 opposite to the second root portion 2221. A second receiving groove 2224 is formed among the second root portion 2221, the second base 221, and the second locking part 2222. Moreover, the second root portion 2221 is approximately perpendicular to the second setting surface 2211. The second locking part 2222 has a second abutting surface 2225 which is parallel to the second setting surface 2211. A distance between the second abutting surface 2225 and the second setting surface 2211 is equal to the thickness of the first locking part 1222. A distance between the first abutting surface 1225 and the first setting surface 1211 is equal to the thickness of the second locking part 2222.

Moreover, the first locking portion 12 includes two first stiffener 124. The two first stiffener 124 is disposed on the first base 121 and is connected to the first root portion 1221 of the first locking hook 122 so as to strengthen the first locking hook 122. The second locking portion 12 further includes two second stiffener 224. The two second stiffener 224 is disposed on the second base 221 and is connected to the second root portion 2221 of the second locking hook 122 so as to strengthen the second locking hook 122.

The connection portion 30 includes a connecting component 31 and a stopping component 32. The connecting component 31 includes a nail head 311 and a nail rod 312. The nail head 311 locates at one end of the nail rod 312 and has a larger outer diameter than that of the nail rod 312 and a diameter of the rotation hole 1231. Another end of the nail rod 312 has inner thread opened therein. The stopping component 32 may be a screw and includes a rod 321 and a nut 322. The rod 321 is screwed into the nail rod 312 and the nut 322 abuts against the first locking portion 12. Moreover, an outer diameter of the nut 322 is larger than that of the rotation hole 1231.

Figure 7:
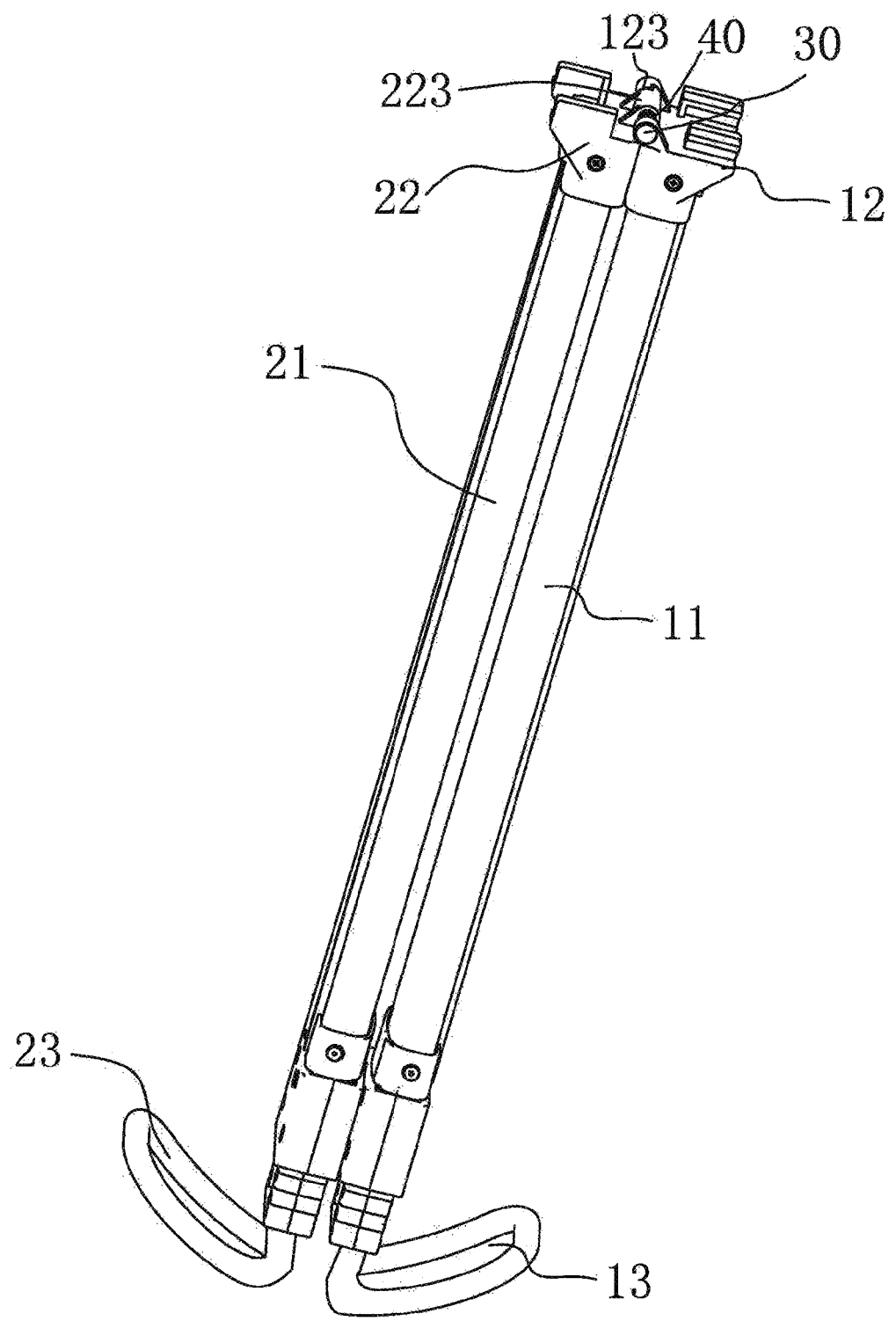
FIG. 7 is a schematic view of the support with self-locking function of FIG. 1 in which the first supporting rod and the second supporting rod are in a folded state.

Referring to FIG. 7 and FIG. 8, when assembling, the two rotating portion 123 is rotatably sleeved on the nail rod 312 of the connecting component 31, that is to say, the nail rod 312 is inserted into the rotation hole 1231. The rotating part 223 is rotatably sleeved on the nail rod 312 of the connecting component 31 and is clamped between the two rotating portion 123. The elastic member 40 is sleeved on the nail rod 312 and is clamped between one side of the rotating part 223 and one of the two rotating portion 123. Another side of the rotating part 223 is fit together with another rotating portion 123. After the stopping component 32 is screwed into the connecting component 31, the elastic member 40 is in an elastic compression state. The first supporting rod 10 and the second supporting rod 20 is rotatably connected together. Therefore, the central axis of the rotation hole 1231 is aligned with the central axes of the connection portion 30, the rotating hole 2231, and the elastic member 40. The elastic member 40 may be a compression spring.

Referring to FIG. 1 to FIG. 8 together, When the support with self-locking function is needed, the second supporting rod 20 is rotated relative to the first supporting rod 10, and the two first locking hooks 122 push the two second locking hooks 222 taken along the nail rod 312 so as to move the rotating part 223 along the first direction of the nail rod 312 to press the elastic member 40. The second supporting rod 20 is continued to rotated until when the second locking part 2222 and the first locking part 1222 are displaced from each other, the elastic member 40 elastically recovers, and the rotating part 223 is pushed to move towards a second direction opposite to the first direction. As a result, The stopper 2232 slides along the spiral step 1232 and is engaged into the groove 1233, and the first locking part 1222 is locked together with the second locking part 2222. That is to say, the second locking hook 222 is located into the first receiving groove 1224 and the first locking hook 122 is located into the second receiving groove 22224 and the first abutting surface 1225 is abutted with the second abutting surface 2225. Therefore, the first supporting rod 10 and the second supporting rod 20 are in an unfolded state as shown in FIG. 8 and the first supporting rod 10 and the second supporting rod 20 are aligned. As a result, two work lights 50 can be installed onto the first supporting rod 10 and the second supporting rod 20 by means of the two first snap rings 111 and the two second snap rings 211 respectively.

Referring to FIG. 6, When the support with self-locking function is not in use, the second supporting rod 20 is pushed in the first direction relative to the first supporting rod 10, so that the second locking part 2222 is disengaged from the first locking part 1222. And at the same time as disengaging, the second supporting rod 20 is rotated. As a result, the first supporting rod 10 and the second supporting rod 20 can be folded up and the first supporting rod 10 and the second supporting rod 20 are in a folded state as shown in FIG. 7. And the central axis of the first supporting rod 11 is parallel to that of the second supporting rod 22.

As described above, the second supporting rod 20 can be rotated relative to the first supporting rod 10 so as to the two first locking portion 122 is snapped respectively with the two second locking portion 222 together to achieve self-locking without manual. In addition, when folding, only the second supporting rod 20 is needed to push relative to the first supporting rod 10 so as to disengage the two first locking portion 122 with the two second locking portion 222. And at the same time as disengaging, the second supporting rod 20 is rotated. As a result, the first supporting rod 10 and the second supporting rod 20 can be folded up. Therefore, the support with self-locking function is very convenient to use.

While the disclosure has been described by way of example and in terms of exemplary embodiment, it is to be understood that the disclosures is not limited thereto. To the contrary, it is intended to lamp shade various modifications and similar arrangements (as would be apparent to those skilled in the art). Therefore, the scope of the appended claims should be accorded the broadest interpretation so as to encompass all such modifications and similar arrangements.

What is claimed is:

1. A support with self-locking function, comprising:
a first supporting rod, a second supporting rod, a connecting portion and an elastic member;
the first supporting rod comprising at least one first locking hook, and two rotating portions, the first supporting rod being sleeved onto the connecting portion by means of the two rotating portions, one of the two rotating portion having a spiral step disposed thereon and a groove opened thereon;
the second supporting rod comprising at least one second locking hook, and a rotating part, the second supporting rod sleeved onto the connecting portion by means of the rotating part, the rotating part having a stopper disposed thereon and being located between the two rotating portions;
the elastic member being sleeved on the connection portion and being elastically clamped between the rotating part and the one of the two rotating portions, the stopper sliding along the spiral step when the second supporting rod being rotated relative to the first supporting rod and being pushed into the groove by an elastic restoring force of the elastic member when the stopper is aligned with the groove, and the at least one first locking hook being locked together with the at least one second locking hook.

2. The support with self-locking function as claimed in claim 1, wherein the first supporting rod comprise a first rod, and a first locking portion embodied onto one end of the first rod, the first locking portion comprises a first base, the at least one first locking hook and the two rotating portions are arranged on one side of the first base opposite to the first rod, the two rotating portions respectively have a rotation hole open thereon, the two rotating portions are rotatably sleeved on the connecting portion by means of the rotation hole; the second supporting rod comprise a second rod, and a second locking portion embodied onto one end of the second rod, the second locking portion comprises a second base, the at least one second locking hook and the rotating part are arranged onto the second base, the rotating part has a rotation hole opened thereon and is rotatably sleeved on the connecting portion; the at least one second locking hook is disengaged with the at least one first locking hook when the second supporting rod press the elastic member and moves along the connecting portion.

3. The support with self-locking function as claimed in claim 2, wherein central axes of the rotating hole and the rotation hole are aligned with that of the elastic member.

4. The support with self-locking function as claimed in claim 2, wherein the connecting portion comprises a connecting component and a stopping component, the two rotating portions and the rotating part are sleeved on the connecting component, the stopping component is locked into the connecting component so as to avoid the two rotating portions from moving relative to the connecting component.

5. The support with self-locking function as claimed in claim 4, wherein the connecting component comprises a nail nut and a nail rod, the two rotating portions and the rotating part are sleeved on the nail rod, the nail nut is arranged on one end of the nail rod and has a larger outer diameter than an outer diameter of the nail rod and a diameter of the rotating hole.

6. The support with self-locking function as claimed in claim 1, wherein the first supporting rod has two first locking hooks, the second supporting rod has two second locking hooks, the two first locking hooks are locked onto the two second locking hooks respectively and are disengaged with the second locking hook when the second supporting rod press the elastic member and moves along the connecting portion.

7. The support with self-locking function as claimed in claim 6, wherein the two first locking hooks are parallel to each other, the arrangement direction of the two first locking hooks is parallel to the central axis of the connecting portion; the two second locking hooks are parallel to each other, the arrangement direction of the two second locking hooks is parallel to the central axis of the connecting portion.

8. The support with self-locking function as claimed in claim 7, wherein the two first locking hooks respectively comprises a first root portion and a first locking part, the first root portion is disposed on the first base, the first locking part extends from the free end of the first root portion taken along a direction parallel to the central axis of the connecting portion.

9. The support with self-locking function as claimed in claim 8, wherein the two second locking hooks respectively comprises a second root portion and a second locking part, the second root portion is disposed on the first base, the second locking part extends from the free end of the second root portion taken along a direction parallel to the central axis of the connecting portion, the extending direction of the second locking portion is opposite to that of the first locking portion.

10. The support with self-locking function as claimed in claim 9, wherein the first locking part has a first guiding surface disposed on a side thereof opposite to the first root portion; the second locking part has a second guiding surface disposed on a side thereof opposite to the second root portion.

* * * * *